US012110742B2

(12) United States Patent
Mora et al.

(10) Patent No.: US 12,110,742 B2
(45) Date of Patent: Oct. 8, 2024

(54) LADDER WITH WIDE RUNG

(71) Applicant: Werner Co., Greenville, PA (US)

(72) Inventors: Daniel C. Mora, Transfer, PA (US); Robert D. Beggs, Stoneboro, PA (US)

(73) Assignee: Werner Co., Greenville, PA (US)

(*) Notice: Subject to any disclaimer, the term of this patent is extended or adjusted under 35 U.S.C. 154(b) by 679 days.

(21) Appl. No.: 17/134,078

(22) Filed: Dec. 24, 2020

(65) Prior Publication Data

US 2021/0115732 A1 Apr. 22, 2021

Related U.S. Application Data

(60) Continuation of application No. 16/207,981, filed on Dec. 3, 2018, now Pat. No. 10,876,355, which is a division of application No. 15/379,086, filed on Dec. 14, 2016, now Pat. No. 10,151,144.

(51) Int. Cl.

*E06C 7/08* (2006.01)
*E06C 1/12* (2006.01)
*E06C 1/02* (2006.01)

(52) U.S. Cl.

CPC ................. *E06C 7/08* (2013.01); *E06C 1/12* (2013.01); *E06C 7/081* (2013.01); *E06C 7/082* (2013.01); *E06C 7/083* (2013.01); *E06C 7/086* (2013.01); *E06C 7/087* (2013.01); *E06C 1/02* (2013.01)

(58) Field of Classification Search

CPC ..... E06C 1/12; E06C 1/02; E06C 7/08; E06C 7/081; E06C 7/082; E06C 7/083; E06C 7/086; E06C 7/087

See application file for complete search history.

(56) References Cited

U.S. PATENT DOCUMENTS

| | | | |
|---|---|---|---|
| 335,051 | A | 1/1886 | Ayres |
| 872,165 | A | 11/1907 | Adler |
| 1,045,957 | A | 12/1912 | Dicks |

(Continued)

FOREIGN PATENT DOCUMENTS

| | | | |
|---|---|---|---|
| CA | 2815004 | A1 | 11/2014 |
| CA | 2895601 | A1 | 12/2016 |

(Continued)

OTHER PUBLICATIONS

Sunset Ladder & Scaffold Blog, What are Ladder Duty Ratings and Ladder Load Capacities?, 2017, Jun. 5, 2017, 8 pp.

(Continued)

*Primary Examiner* — Colleen M Chavchavadze

(74) *Attorney, Agent, or Firm* — Fitch, Even, Tabin & Flannery LLP

(57) ABSTRACT

A ladder having a first rail and a second rail. The ladder having a standard rung having a width permanently attached to the first rail and the second rail. The ladder having a first wide rung having a width greater than the width of the standard rung, which is permanently attached to the first rail and the second rail. The ladder having a second wide rung having a width greater than the width of the standard rung, which is permanently attached to the first rail and the second rail. The first wide rung and the second wide rung are disposed in a work zone of the ladder. The work zone of the ladder is where a user typically stands on the ladder while performing tasks. The standard rung is disposed outside the work zone.

11 Claims, 7 Drawing Sheets

(56) References Cited

U.S. PATENT DOCUMENTS

| | | | | |
|---|---|---|---|---|
| 1,784,413 | A | 12/1930 | Bauer | |
| 1,820,315 | A | 8/1931 | Miller | |
| 1,920,552 | A | 8/1933 | Dollerhide | |
| 2,486,783 | A | 11/1949 | Hartman | |
| 2,528,317 | A | 10/1950 | Newman | |
| 2,649,237 | A | 8/1953 | Bjorklund | |
| 2,650,749 | A | 9/1953 | Balogh | |
| 2,730,412 | A | 1/1956 | Yoder | |
| 2,805,104 | A | 9/1957 | Herman | |
| 2,975,857 | A | 3/1961 | Suroff | |
| 2,989,141 | A | 6/1961 | Howard | |
| 3,091,313 | A | 5/1963 | Colbath | |
| 3,112,811 | A | 12/1963 | Moran | |
| 3,115,214 | A | 12/1963 | Roberts | |
| 3,276,543 | A | 10/1966 | Kanoza | |
| 3,294,197 | A | 12/1966 | Kwiatkowski | |
| 3,901,353 | A | 8/1975 | Skolnik | |
| 4,027,741 | A | 6/1977 | Derrick | |
| 4,256,200 | A | 3/1981 | Loix | |
| 4,332,308 | A | 6/1982 | Larson | |
| 4,421,206 | A | 12/1983 | Walter | |
| 4,541,508 | A | 9/1985 | Lundh | |
| 4,549,632 | A | 10/1985 | Inoue | |
| 4,804,063 | A | 2/1989 | Farris | |
| 5,050,706 | A | 9/1991 | Cole | |
| 5,056,620 | A | 10/1991 | Zumwalt | |
| 5,779,208 | A | 7/1998 | McGraw | |
| 6,786,300 | B1 | 9/2004 | Bonifacini | |
| 6,802,393 | B2 | 10/2004 | Zheng | |
| 6,991,063 | B2 | 1/2006 | Latimer | |
| 6,994,184 | B2 | 2/2006 | Latimer | |
| 7,108,103 | B2 | 9/2006 | Meeker | |
| 7,578,371 | B2 | 8/2009 | Allred, III | |
| 7,621,374 | B2 | 11/2009 | Richey | |
| 7,931,123 | B2 | 4/2011 | Moldthan | |
| 8,381,875 | B2 | 2/2013 | Leng | |
| D683,479 | S | 5/2013 | Magnus | |
| 8,499,511 | B2 | 8/2013 | Platt | |
| 8,579,081 | B2 | 11/2013 | Richey | |
| 8,657,070 | B2 | 2/2014 | O'Brien | |
| 8,668,049 | B2 | 3/2014 | Leng | |
| 8,727,074 | B1 | 5/2014 | Bhajan | |
| 8,820,034 | B1 | 9/2014 | Watts | |
| 9,422,767 | B2 | 8/2016 | Russell | |
| 9,435,126 | B2 | 9/2016 | Kasinski | |
| 9,677,336 | B2 | 6/2017 | Najey | |
| 9,695,630 | B1 | 7/2017 | Arthur | |
| 9,890,589 | B2 | 2/2018 | Goodnow | |
| 10,006,248 | B2 | 6/2018 | Goodnow | |
| 10,012,022 | B1 | 7/2018 | Stentiford, Sr. | |
| 10,151,144 | B2 * | 12/2018 | Mora | E06C 7/087 |
| 10,352,098 | B2 | 7/2019 | Frensley | |
| 10,538,966 | B2 | 1/2020 | Woodward | |
| 10,648,234 | B2 | 5/2020 | Skubic | |
| 10,876,355 | B2 * | 12/2020 | Mora | E06C 7/087 |
| 10,876,356 | B2 | 12/2020 | Russell | |
| 11,215,010 | B2 | 1/2022 | Woodward | |
| 11,274,495 | B2 | 3/2022 | Garay | |
| 2005/0029044 | A1 | 2/2005 | Brett | |
| 2007/0034450 | A1 | 2/2007 | Richey | |
| 2007/0181364 | A1 | 8/2007 | Lair | |
| 2007/0181369 | A1 | 8/2007 | Gibson | |
| 2007/0240935 | A1 | 10/2007 | O'Brien | |
| 2008/0060874 | A1 | 3/2008 | Lair | |
| 2008/0179137 | A1 | 7/2008 | Latimer | |
| 2009/0032334 | A1 | 2/2009 | Moldthan | |
| 2011/0297482 | A1 | 12/2011 | O'Brien | |
| 2012/0199417 | A1 | 8/2012 | Richey | |
| 2013/0048429 | A1 | 2/2013 | Lonergan | |
| 2013/0256057 | A1 | 10/2013 | Kasinski | |
| 2014/0196388 | A1 | 7/2014 | Bogustaw | |
| 2014/0224585 | A1 | 8/2014 | Russell | |
| 2014/0326538 | A1 | 11/2014 | Najey | |
| 2015/0090533 | A1 | 4/2015 | Moss | |
| 2016/0076304 | A1 | 3/2016 | Smith | |
| 2016/0376844 | A1 | 12/2016 | Najey | |
| 2017/0167198 | A1 | 6/2017 | Goodnow | |
| 2018/0163468 | A1 | 6/2018 | Mora | |
| 2018/0171714 | A1 | 6/2018 | Dings | |
| 2018/0347278 | A1 | 12/2018 | Russell | |
| 2019/0063073 | A1 | 2/2019 | Woodward | |
| 2019/0100963 | A1 | 4/2019 | Mora | |
| 2020/0149347 | A1 | 5/2020 | Woodward | |
| 2021/0222492 | A1 | 7/2021 | Moss | |
| 2022/0120137 | A1 | 4/2022 | Woodward | |
| 2022/0154530 | A1 | 5/2022 | Barker | |
| 2024/0110442 | A1 | 4/2024 | Woodward | |

FOREIGN PATENT DOCUMENTS

| | | | | |
|---|---|---|---|---|
| CA | 2947548 | A1 | 10/2017 | |
| CA | 3004242 | A1 | 11/2018 | |
| CH | 683445 | A5 * | 3/1994 | E06C 7/086 |
| CN | 2854041 | Y * | 1/2007 | E06C 7/08 |
| CN | 101611238 | A | 12/2009 | |
| CN | 105781407 | | 7/2016 | |
| CN | 207245609 | | 4/2018 | |
| DE | 29710802 | | 10/1997 | |
| DE | 202019004166 | U1 | 2/2020 | |
| DE | 202020002721 | U1 | 11/2020 | |
| DE | 102019118191 | | 1/2021 | |
| EP | 0106583 | A3 | 7/1984 | |
| EP | 1607570 | A2 | 12/2005 | |
| EP | 2578768 | A2 | 4/2013 | |
| EP | 3109395 | | 12/2016 | |
| EP | 3112579 | A1 * | 1/2017 | E06C 1/20 |
| EP | 3524769 | | 8/2019 | |
| EP | 3604730 | A1 | 2/2020 | |
| ES | 1057792 | | 9/2004 | |
| FR | 2589515 | | 5/1987 | |
| FR | 2862679 | | 5/2005 | |
| FR | 2916794 | A1 * | 12/2008 | E06C 7/084 |
| FR | 2970017 | A1 * | 7/2012 | E06C 7/087 |
| GB | 441140 | | 1/1936 | |
| GB | 441140 | A * | 1/1936 | E06C 1/32 |
| GB | 2128239 | A | 4/1984 | |
| KR | 200172233 | Y1 * | 3/2000 | E06C 7/081 |
| KR | 200313910 | | 5/2003 | |
| KR | 200409710 | | 3/2006 | |
| PL | 220639 | | 11/2015 | |
| PL | 228252 | | 3/2018 | |
| PL | 229816 | | 8/2018 | |
| WO | 9003487 | | 4/1990 | |
| WO | 2005054595 | | 6/2005 | |
| WO | 2011087385 | A2 | 7/2011 | |
| WO | 2011087386 | A1 | 7/2011 | |
| WO | 2015048271 | A1 | 4/2015 | |

OTHER PUBLICATIONS

U.S. Patent and Trademark Office, Non-Final Office Action issued in U.S. Appl. No. 17/564,191, filed Oct. 21, 2022, 9 pp.

USPTO; U.S. Appl. No. 17/564,191; Non-Final Rejection mailed Jul. 11, 2023; (pp. 1-15).

* cited by examiner

LADDER WITH WIDE RUNG

CROSS-REFERENCE TO RELATED APPLICATIONS

This is a continuation of U.S. patent application Ser. No. 16/207,981 filed Dec. 3, 2018, now U.S. Pat. No. 10,876,355 issued Dec. 29, 2020, which is a divisional of U.S. patent application Ser. No. 15/379,086 filed Dec. 14, 2016, now U.S. Pat. No. 10,151,144 issued Dec. 11, 2018, all of which are incorporated by reference herein.

FIELD OF THE INVENTION

The present invention is related to a ladder having wide rungs located in a work zone of the ladder. (As used herein, references to the "present invention" or "invention" relate to exemplary embodiments and not necessarily to every embodiment encompassed by the appended claims.) More specifically, the present invention is related to a ladder having wide rungs located in a work zone of the ladder where the wide rungs are attached With fasteners through covers to the rails of the ladder.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

When using a ladder, the wider the rung that the user stands on, typically the more secure the user feels standing on the rung because the wider the rung the wider the surface area for the user to place his or her feet on the rung. By having a greater surface area, it feels more like standing on the ground or a floor that is the natural position for user when standing.

The width of a rung is determined by the amount of material used for the wrong, how the rung is attached to a rail, and that the rung does not interfere with the operation or the use of the ladder. The amount of material is desired to be minimized to reduce the weight that the rang contributes to the overall weight of the ladder, yet still be strong enough to support the necessary weight of the user. The rung needs to be securely attached to the rails of the ladder so there is no issue that when the user stands on the rung, the rung will not come loose a break away from the rails. The rung cannot be so wide that it interferes with the user climbing the rungs and possibly catching a foot on the rung is a user climbs a ladder, or striking a knee against the rung as the user lifts his or her leg there's the user climbs the ladder. In addition, the rung should not Ire so wide that it could catch on an object when the ladder is being moved, where make it difficult for the ladder to be stored. Furthermore, in regard to an extension ladder, the rungs should not interfere with the movement of the sections of the extension ladder. In regard to a stepladder, the rungs should not impede with the opening and closing of the sections. Accordingly, it is generally desired to provide for a rung with a width as large as possible given the aforementioned constraints.

BRIEF SUMMARY OF THE INVENTION

The present invention pertains to a ladder. The ladder comprises a first rail. The ladder comprises a second rail. The ladder comprises a standard rung having a width permanently attached to the first rail and the second rail. The ladder comprises a first wide rung having a width greater than the width of the standard rung, which is permanently attached to the first rail and the second rail. The ladder comprises a second wide rung having a width greater than the width of the standard rung, which is permanently attached to the first rail and the second rail. The first wide rung and the second wide rung are disposed in a work zone of the ladder. The work zone of the ladder is where a user typically stands on the ladder while performing tasks. The standard rung is disposed below the work zone.

The present invention pertains to a wide rung for attachment to a first rail and a second rail of a ladder. The wide rung comprises a top portion and a front and a hack and a right side and a left side. The wide rung comprises first segment connected to and extending down front the front of the top portion, a second segment connected to and extending down from the back of the top portion, a third segment connected to and extending inward toward the back from the first segment, a fourth segment connected to and extending down from the second segment inward toward the front and connected to the third segment two. The wide rung comprises a first boss adjacent the front of the top portion, a second boss adjacent the back of the top portion, and a third boss adjacent to the third and fourth segments. The wide rung is hollow and a one piece extrusion and having a somewhat D-shaped cross-section.

The present invention pertains to a method for climbing a ladder. The method comprises the steps of placing a foot by a user on a standard rung attached to a first rail and a second rail of the ladder, the standard rung having a width. There is the step of placing the foot of the user on a first wide rune attached to the first rail and the second rail of the ladder. The first wide rung having a width greater than the width of the standard rung. The ladder having a second wide rung having a width greater than the width of the standard rung attached to the first rail and the second rail. The first wide rung and the second wide rung disposed in a work zone of a ladder. The standard rung disposed outside the work zone of the ladder. The first wide rung is hollow and a one piece extrusion having a right side and a left side and a somewhat D-shaped cross-section formed of a top portion having a width greater than the width of a standard rung, and a front and a back. A first segment is connected to and extending down from the front of the top portion. A second segment is connected to and extending down from the back of the top portion. A third segment is connected to and extending inward toward the hack from the first segment. A fourth segment is connected to and extending down from the second segment inward toward the front and connected to the third segment. There is a first boss adjacent the front of the top portion, a second boss adjacent the back of the top portion, and a third boss adjacent to the third and fourth segments. The ladder including a right cover attached to the right side of the first wide rung, a left cover attached to the left side of the first wide rung. Each cover having a cross-section which conforms with the cross-section of the first wide rung, a closed face having a first hole and a second hole in a third hole whose locations in the face align with the first boss and second boss and third boss, respectively. Each cover has a top side that extends inward from the face in alignment with the top portion and is positioned over the top portion, a first side that extends inward from the face in alignment with the first segment and is positioned over the first segment, a second side that extends inward from the face in alignment with the second segment and is positioned over the second segment, a third side that extends inward from the face in alignment with the third segment and is positioned over the third segment, and a fourth side that extends inward from the face in alignment with the fourth segment and is positioned over the fourth segment. The ladder including right side fasteners which extend through the first rail and the first and second and third holes of the right cover and the first and second and third bosses, respectively, to attach the right side of the first wide rung and the right cover to the first rail, the ladder including left side fasteners which extend through the second rail and the first and second and third holes of the left cover and the first and second and third bosses, respectively, to attach the left side of the first wide rung and the left cover to the second rail.

The present invention pertains to a method for producing a ladder. The method comprises the steps of attaching a standard rung having a width to a first rail and a second rail of a ladder. There is the step of attaching a first wide rung to the first rail and the second rail of the ladder, the first wide rung having a width greater than the width of the standard rung. There is the step of attaching a second wide rung to the first rail and the second rail of the ladder. The second wide rung having a width greater than the width of the standard rung.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
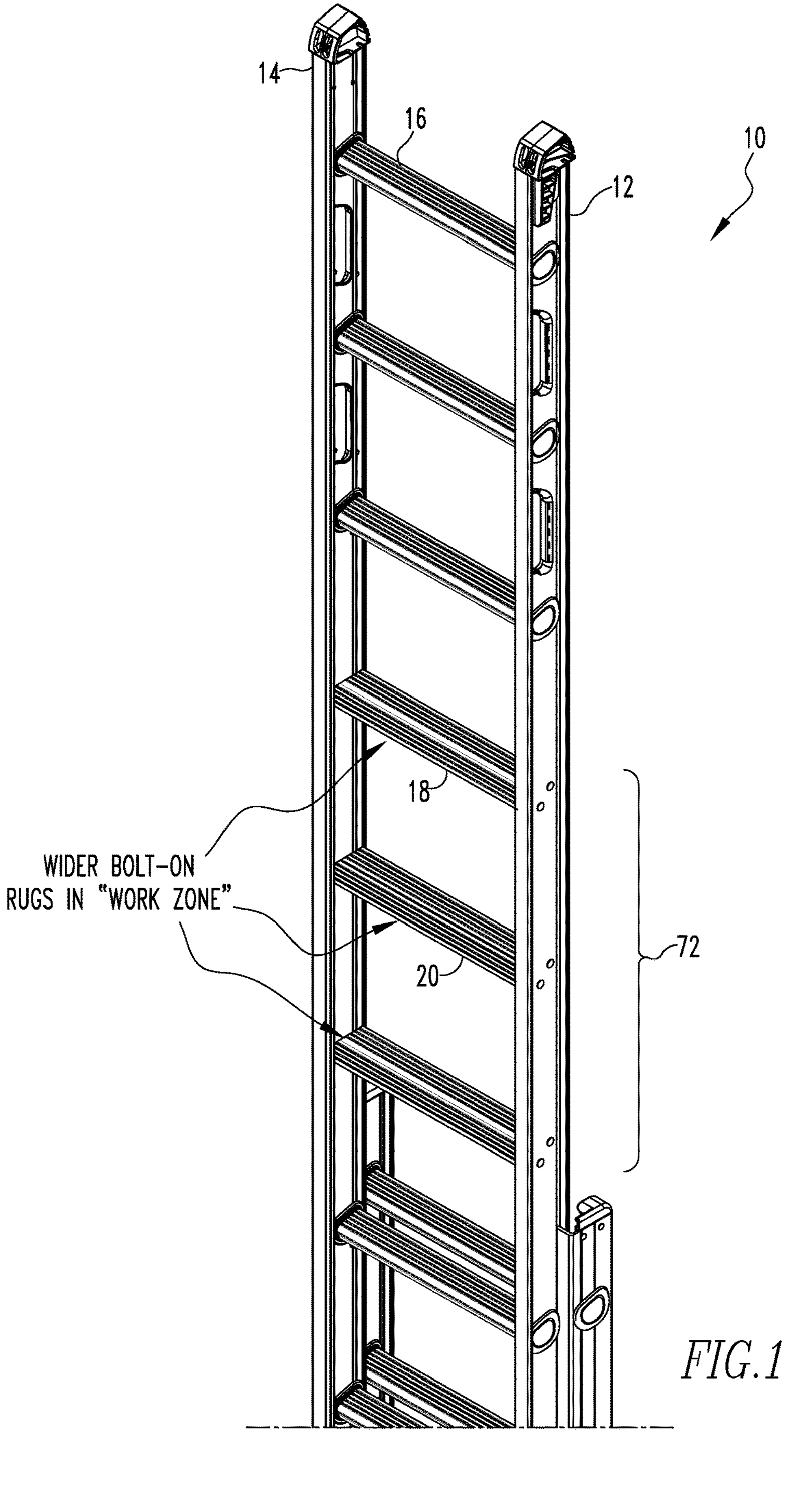
FIG. 1 shows a ladder of the present invention.
Figure 2:
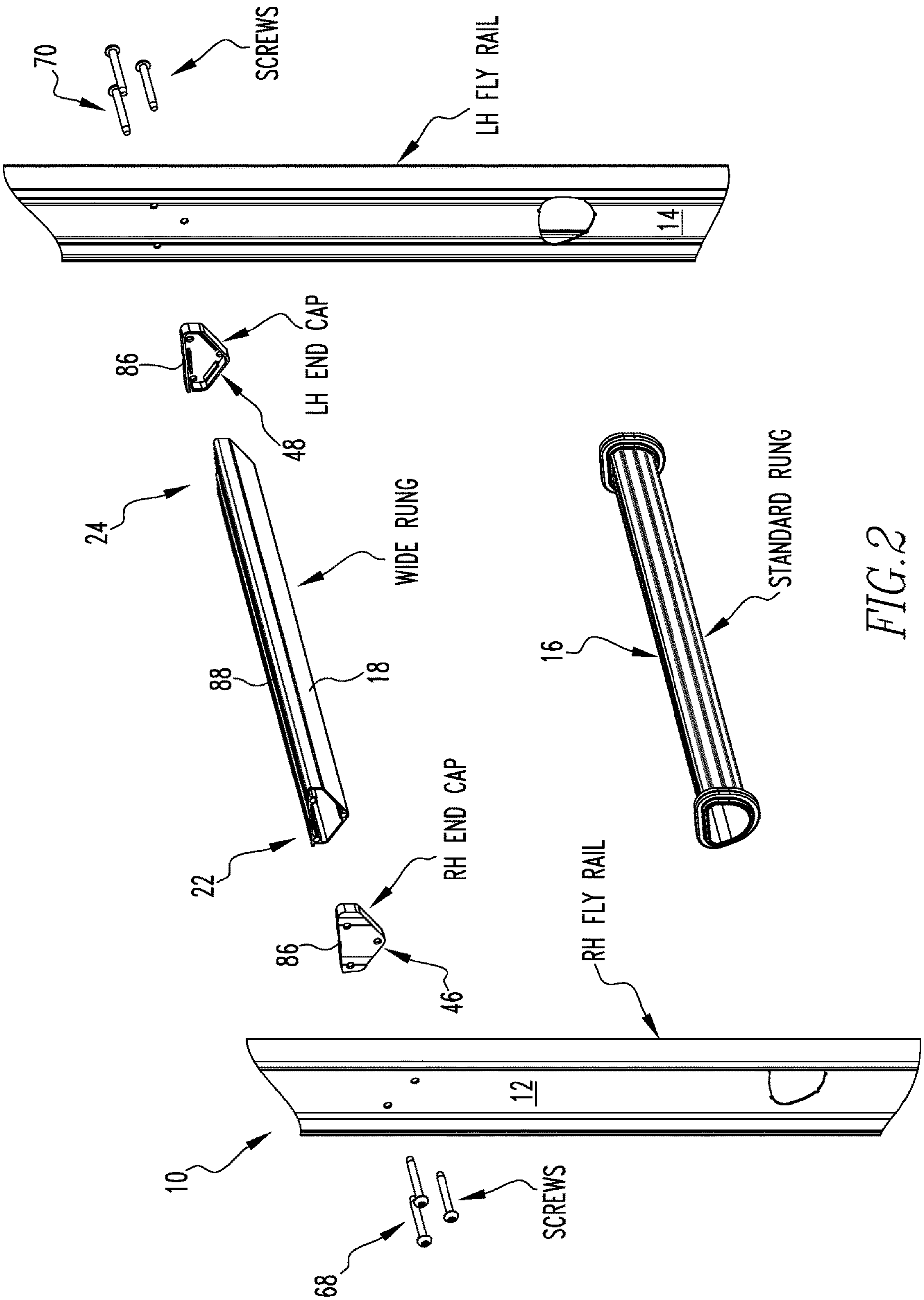
FIG. 2 is an exploded view of the ladder.

Referring now to the drawings wherein like reference numerals refer to similar or identical parts throughout the several views, and more specifically to FIGS. 1 and 2 thereof, there is shown a ladder 10. The ladder 10 comprises a first rail 12. The ladder 10 comprises a second tail 14. The ladder 10 comprises a standard rung 16 having a width permanently attached to the first rail 12 and the second rail 14. The ladder 10 comprises a first wide rung 18 having a width greater than the width of the standard rung 16, which is permanently attached to the first rail 12 and the second rail 14. The ladder 10 comprises a second wide rung 20 having a width greater than the width of the standard rung 16, which is permanently attached to the first rail 12 and the second rail 14. The first wide rung 18 and the second wide rung 20 are disposed in a work zone 72 of the ladder 10. The work zone 72 of the ladder 10 is where a user typically stands on the ladder 10 while performing tasks. The standard rung 16 is disposed below the work zone 72.

Figure 3:
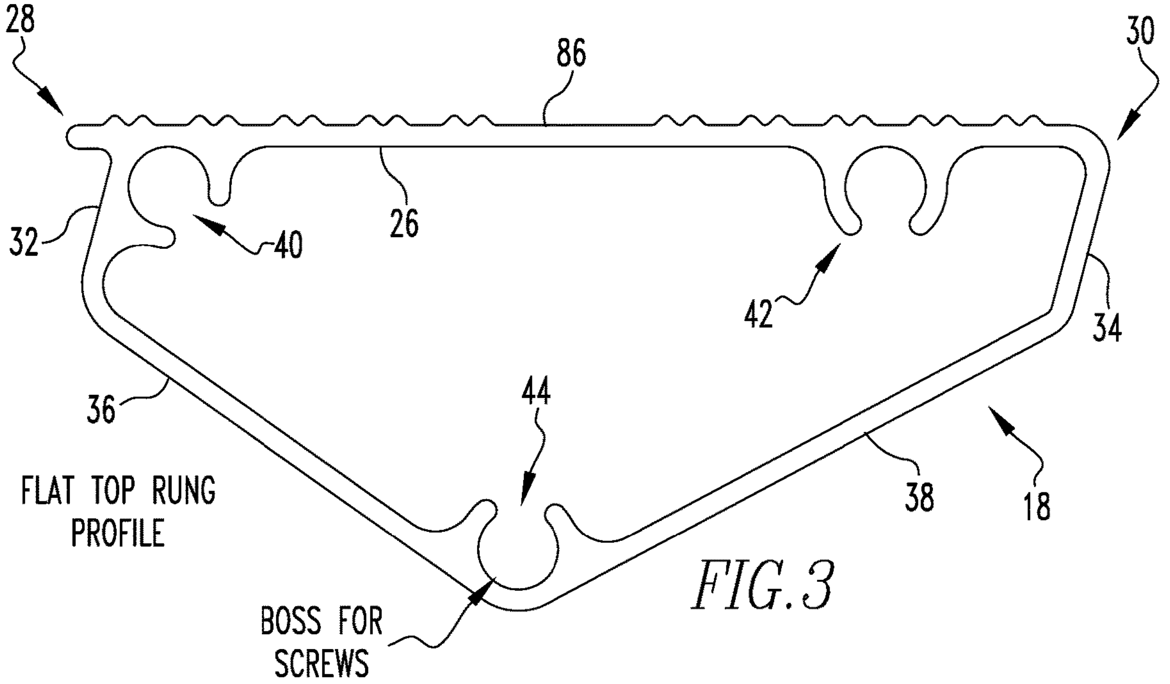
FIG. 3 is a cross-sectional view of a wide rung.
Figure 4:
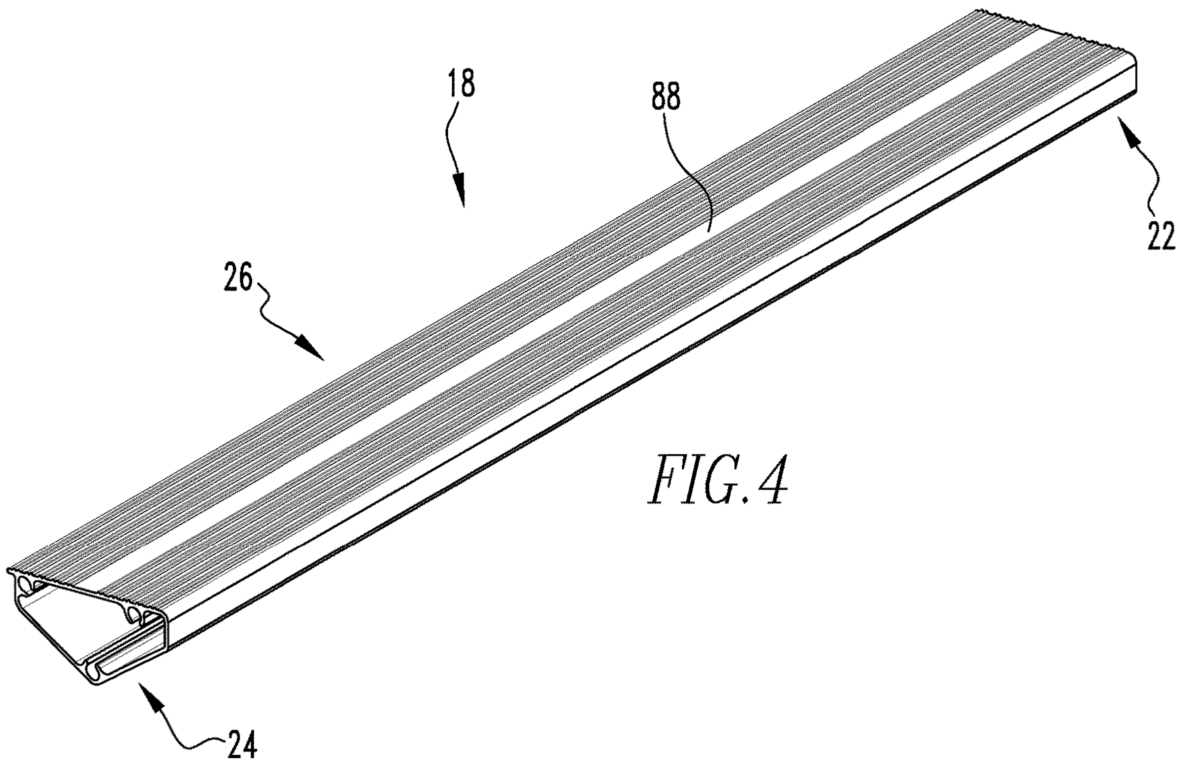
FIG. 4 is perspective view of the wide rung.

The first wide rung 18 may be hollow and include a one piece extrusion having a right side 22 and a left side 24 and a somewhat D-shaped cross-section, as shown in FIGS. 3 and 4. The first wide rung 18 may be formed of a top portion 26 having a width wider than the width of the first rail 12 and a front 28 and a back 30, a first segment 32 connected to and extending down from the front 28 of the top portion 26, a second segment 34 connected to and extending down from the hack 30 of the top portion 26, a third segment 36 connected to and extending inward toward the back 30 from the first segment 32, a fourth segment 38 connected to and extending down from the second segment 34 inward toward the front 28 and connected to the third segment 36. The first wide rung 18 may include a first boss 40 adjacent the front 28 of the top portion 26, a second boss 42 adjacent the hack 30 of the top portion 26, and a third boss 44 adjacent to the third and fourth segments 36, 38.

As shown in FIGS. 5-10, the first wide rung 18 may include a right cover 46 attached to the right side 22 of the first wide rung 18. The first wide rung 18 may include a left cover 48 attached to the left side 24 of the first wide rung 18. Each cover may have a cross-section which conforms with the cross-section of the first wide rung 18, a closed face 50 having a first hole 52 and a second hole 54 in a third hole 56 whose locations in the face 50 align with the first boss 40 and second boss 42 and third boss 44, respectively. Each cover may include steps a top side 66 that extends inward from the face 50 in alignment with the top portion 26 and is positioned over the top portion 26, a first side 58 that extends inward from the face 50 in alignment with the first segment 32 and is positioned over the first segment 32, a second side 60 that extends inward from the face 50 in alignment with the second segment 34 and is positioned over the second segment 34, a third side 62 that extends inward from the face 50 in alignment with the third segment 36 and is positioned over the third segment 36, and a fourth side 64 that extends inward from the face 50 in alignment with the fourth segment 38 and is positioned over the fourth segment 38.

The first wide rung 18 may include right side fasteners 68 which extend through the first rail 12 and the first and second and third holes 52, 54, 56 of the right cover 46 and the first and second and third bosses 40, 42, 44, respectively, to attach the right side 22 of the first wide rung 18 and the right cover 46 to the first rail 12, as shown in FIG. 2. The first wide rung 18 may include left side fasteners 70 which extend through the second rail 14 and the first and second and third holes 52, 54, 56 of the left cover 48 and the first and second and third bosses 40, 42, 44, respectively, to attach the left side 24 of the first wide rung 18 and the left cover 48 to the second rail 14. The rails have predrilled holes aligned with the holes in the covers and the three bosses to facilitate the placement of the fasteners.

Figure 5:
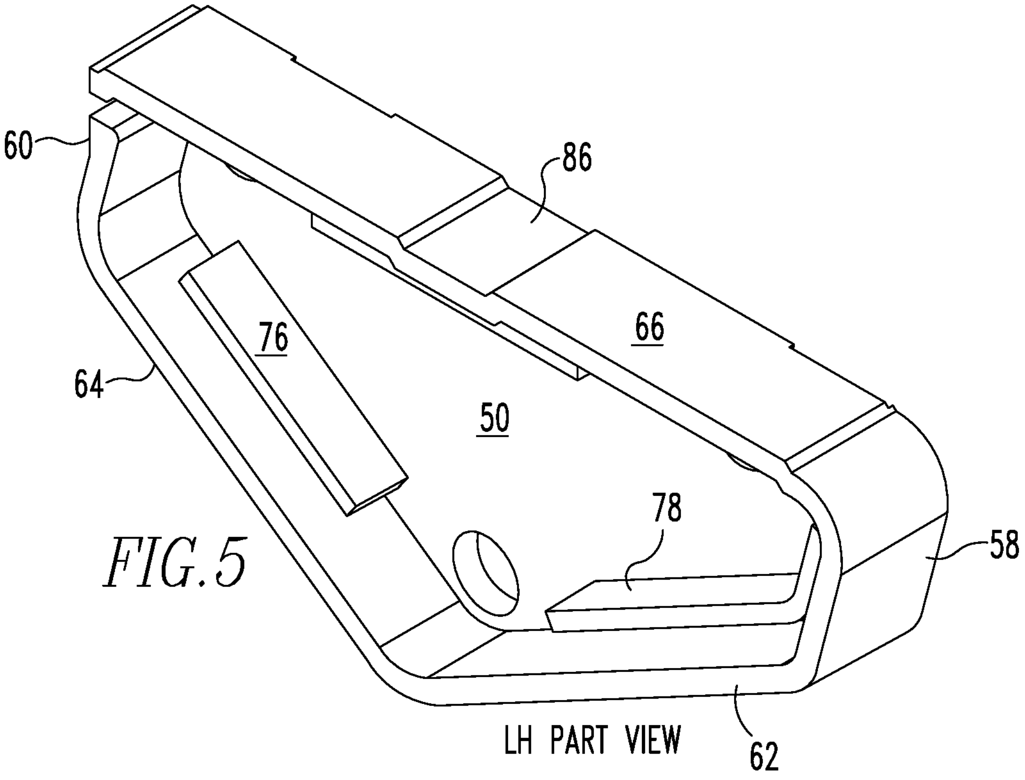
FIG. 5 is a rear perspective view of a left cover.
Figure 6:
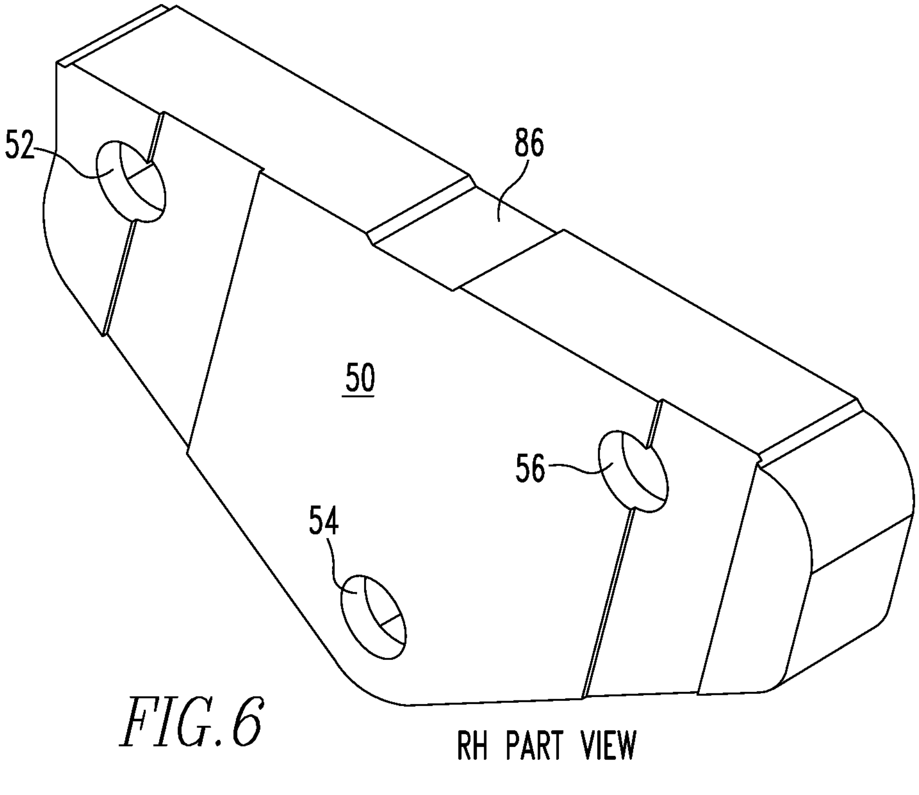
FIG. 6 is a front perspective view of the right cover.
Figure 7:
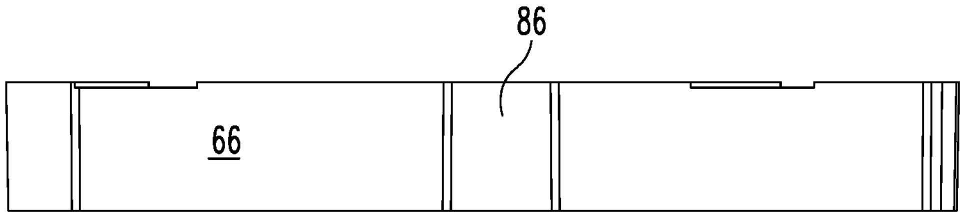
FIG. 7 is an overhead view of a cover.
Figure 8:
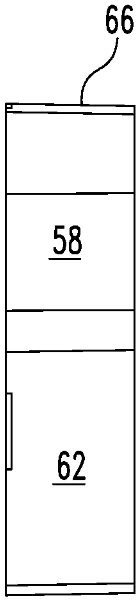
FIG. 8 is a side view of the cover.
Figure 9:
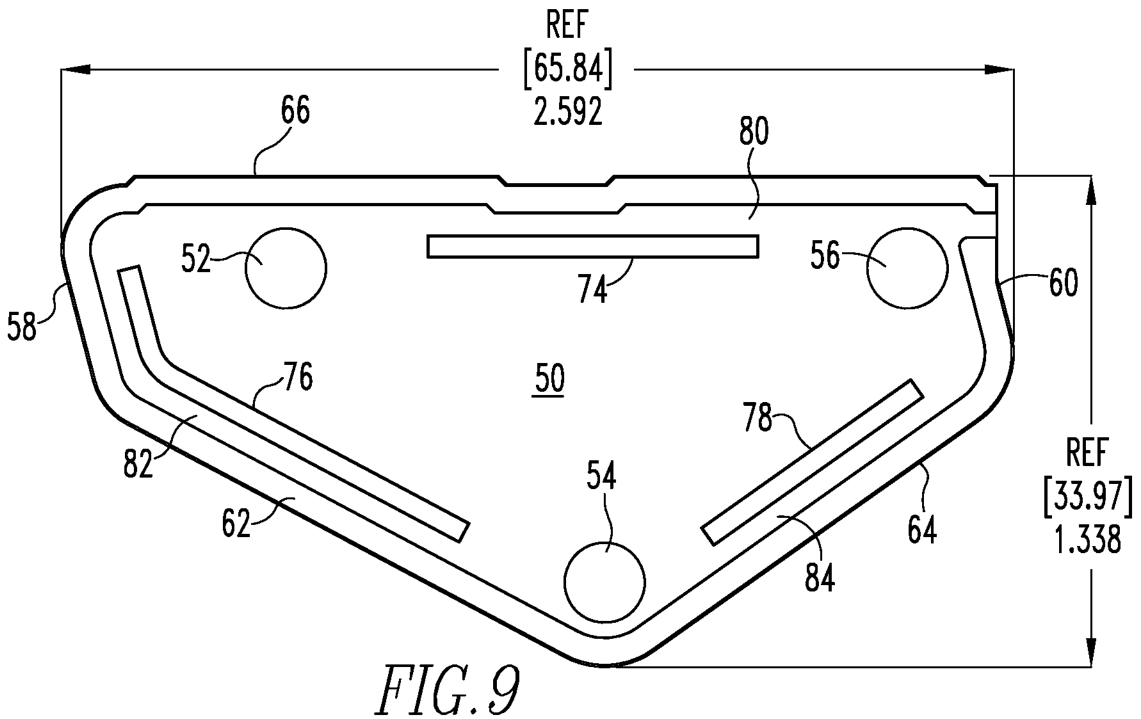
FIG. 9 is a hack view of the cover.
Figure 10:
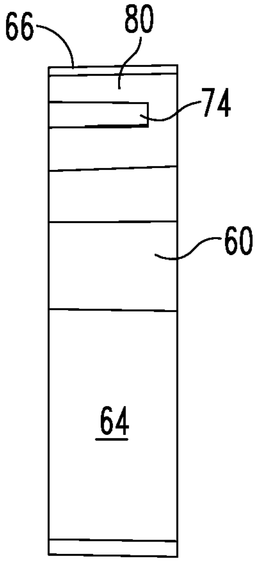
FIG. 10 is a side view of the cover.

The first and second wide rungs 18, 20 may be the only wide rungs attached to the first and second rails 12, 14, although there may be a third or a fourth or even more wide rungs attached to the first and second rails 12, 14 in the work zone 72, as needed indicated by the use. Each cover may be made of plastic and each wide rung may be made of aluminum. As shown in FIGS. 5 and 9, each cover may have a first plate 74 extending inward from the face 50 and in parallel and spaced relation from the top side 66 to define a first slot 80 in which the top portion 26 is disposed, a second plate 76 extending inward from the face 50 and in parallel space relation from the third side 62 to define a second sit 82 in which the third segment 36 is disposed, and a third plate 78 extending inward from the face 50 and in parallel and spaced relation from the fourth side 64 to define a third slot 84 in which the fourth segment 38 is disposed.

The present invention pertains to a wide rung for attachment to a first rail 12 and a second rail 14 of a ladder 10. The wide rung comprises a top portion 26 and a front 28 and a back 30 and a right side 22 and a left side 24. The wide rung comprises first segment 32 connected to and extending down from the front 28 of the top portion 26, a second segment 34 connected to and extending down from the back 30 of the top portion 26, a third segment 36 connected to and extending inward toward the back 30 from the first segment 32, a fourth segment 38 connected to and extending down from the second segment 34 inward toward the front 28 and connected to the third segment 36 two. The wide rung comprises a first boss 40 adjacent the front 28 of the top portion 26, a second boss 42 adjacent the back 30 of the top portion 26, and a third boss 44 adjacent to the third and fourth segments 36, 38. The wide rung is hollow and a one piece extrusion and having a somewhat D-shaped cross-section.

The present invention pertains to a method for climbing a ladder 10. The method comprises the steps of placing a foot by a user on a standard rung 16 attached to a first rail 12 and a second rail 14 of the ladder 10, the standard rung 16 having a width. There is the step of placing the foot of the user on a first wide rung 18 attached to the first rail 12 and the second rail 14 of the ladder 10. The first wide rung 18 having a width greater than the width of the standard rung 16. The ladder 10 having a second wide rung 20 having a width greater than the width of the standard rung 16 attached to the first rail 12 and the second rail 14. The first wide rung 18 and the second wide rung 20 disposed in a work zone 72 of a ladder 10. The standard rung 16 disposed outside the work zone 72 of the ladder 10. The first wide rung 18 is hollow and a one piece extrusion having a right side 22 and a left side 24 and a somewhat D-shaped cross-section formed of a top portion 26 having a width greater than the width of a standard rung 16, and a front 28 and a back 30. A first segment 32 is connected to and extending down from the front 28 of the top portion 26. A second segment 34 is connected to and extending down from the back 30 of the top portion 26. A third segment 36 is connected to and extending inward toward the back 30 from the first segment 32. A fourth segment 38 is connected to and extending down from the second segment 34 inward toward the front 28 and connected to the third segment 36. There is a first boss 40 adjacent the from 28 of the top portion 26, a second boss 42 adjacent the back 30 of the top portion 26, and a third boss 44 adjacent to the third and fourth segments 36, 38. The ladder 10 including a right cover 46 attached to the right side 22 of the first wide rung 18, a left cover 48 attached to the left side 24 of the first wide rung 18. Each cover having a cross-section which conforms with the cross-section of the first wide rung 18, a closed face 50 having a first hole 52 and a second hole 54 in a third hole 56 whose locations in the face 50 align with the first boss 40 and second boss 42 and third boss 44, respectively. Each cover has a top side 66 that extends inward from the face 50 in alignment with the top portion 26 and is positioned over the top portion 26, a first side 58 that extends inward from the face 50 in alignment with the first segment 32 and is positioned over the first segment 32, a second side 60 that extends inward from the face 50 in alignment with the second segment 34 and is positioned over the second segment 34, a third side 62 that extends inward from the face 50 in alignment with the third segment 36 and is positioned over the third segment 36, and a fourth side 64 that extends inward from the face 50 in alignment with the fourth segment 38 and is positioned over the fourth segment 38. The ladder 10 including right side fasteners 68 which extend through the first rail 12 and the first and second and third holes 52, 54, 56 of the right cover 46 and the first and second and third bosses 40, 42, 44, respectively, to attach the right side 22 of the first wide rung 18 and the right cover 46 to the first rail 12, the ladder 10 including left side fasteners 70 which extend through the second rail 14 and the first and second and third holes 52, 54, 56 of the left cover 48 and the first and second and third bosses 40, 42, 44, respectively, to attach the left side 24 of the first wide rang 18 and the left cover 48 to the second rail 14.

The present invention pertains to a method for producing a ladder 10, The method comprises the steps of attaching a standard rung 16 having a width to a first rail 12 and a second rail 14 of a ladder 10. There is the step of attaching a first wide rung 18 to the first rail 12 and the second rail 14 of the ladder 10, the first wide rung 18 having a width greater than the width of the standard rung 16. There is the step of attaching a second wide rung 20 to the first rail 12 and the second rail 14 of the ladder 10. The second wide rung 20 having a width greater than the width of the standard rung 16.

This invention consists of extruded aluminum ladder 10 rungs specifically designed to be used in the "work zone 72" at the upper end of an extension ladder fly section. These rungs are wider from front 28 to rear so as to provide a more comfortable standing surface than conventional round or D-shaped rungs. Because of their wider and flatter shape (formed from linear segments or walls as shown FIGS. 2-4), these rungs are not swaged to the rails in the usual fashion but are designed with integral bosses (arcuate slots) to receive self-threading screws to hold them solidly to the rails.

The use of wider rungs in the "work zone 72" of climbing products can be applied to step ladders, MT ladders, M ladders, and attic ladders, etc. The use of wide rungs provides significantly increased comfort for ladder users working in the work zone 72 near the top of the ladder 10. As an example, the top portion 26 of each wide rung may be between 2 inches and 4 inches and preferably about 2.5 inches wide, and the length of each wide rung is between 12 inches and 16 inches and preferably about 14.5 inches. The top side 66 of each cover is about 0.1 inches wider than the width of the top portion 26 so the top side 66 can snugly and tightly fit over the top portion 26. The length of the sides of each cover is about an inch to two inches. The width of the rails, preferably about 3 inches, is slightly lamer than the width of the cover so the cover and the wide rung do not extend beyond the width of the rails.

Each cover has a cover channel 86 disposed at the center of the top side 66 which aligns with a rung channel 88 disposed about the center of the top portion 26. The rung channel 88 serves to facilitate, the proper placement of a cover with the rung. The cover channel 86 is positioned to fit into the rung channel 88 when each cover is placed onto an end of the rung so each cover is in proper position.

Figure 11:
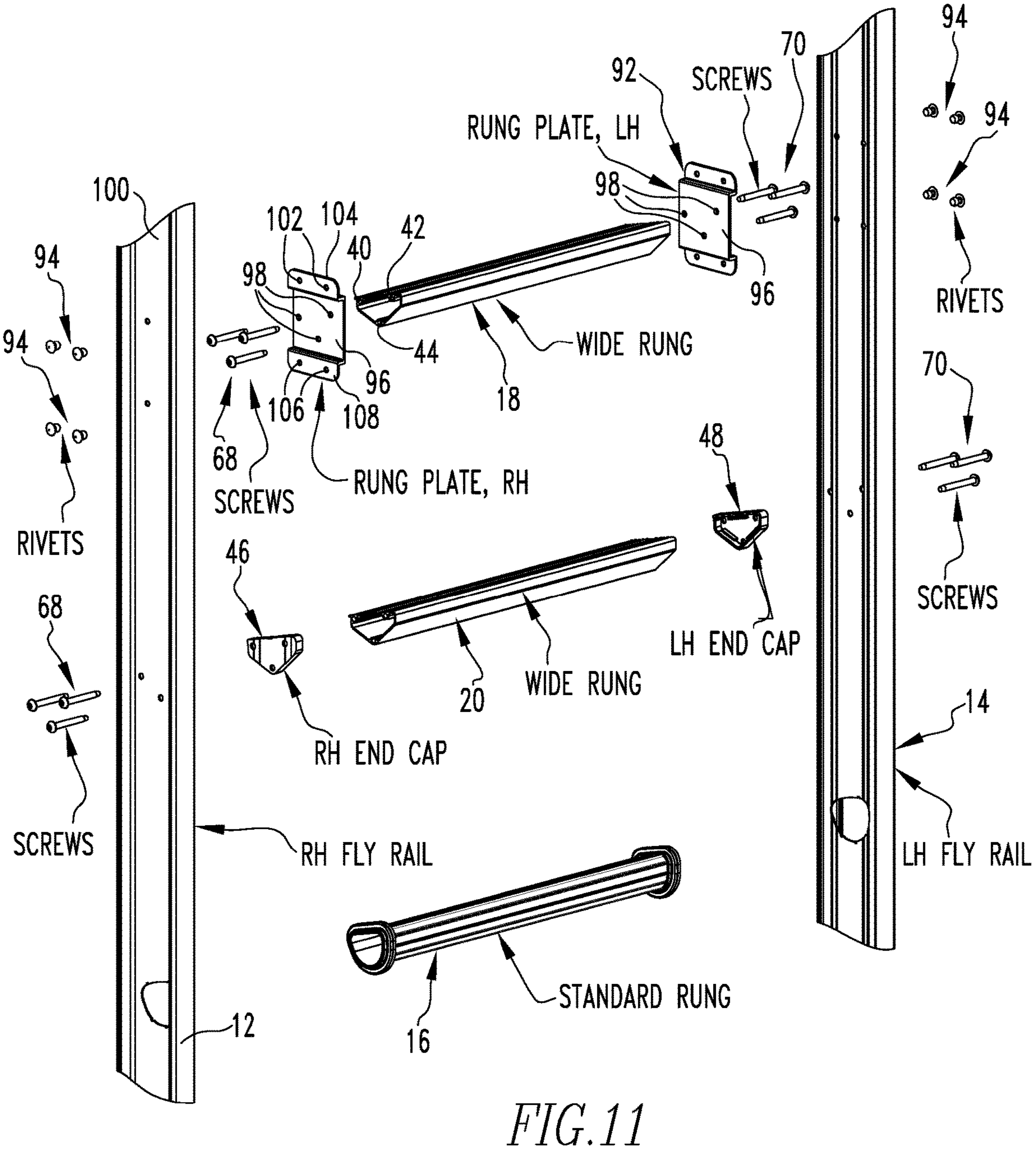
FIG. 11 is an exploded view of the ladder using rung plates.

FIG. 11 shows the use of a right rung plate 90 and a left rung plate 92 to secure and attach the first wide rung 18 to the first rail 12 and second rail 14, respectively, as an alternative technique to the use of the right cover 46 and the left cover 48. Each rung plate has a center portion 96 with at least one, and preferably three plate holes 98. The right rung plate 90 receives right side fasteners 68, preferably screws, in each of the plate holes 98 that engage with first, second and third bosses to attach the right rung plate 90 to the first wide rung 18. Similarly, left side fasteners 70, preferably screws, extend through the three plate holes 98 in the left rung plate 92 into the first, second and third bosses to attach the left rung plate 92 to the first wide rung 18. In turn, the right rung plate 90, now attached to the first wide rung 18, is attached to the first rail 12 with rivets 94 that extends through the first rail 12, preferably at a web 100 of the first rail 12 and into the upper flange holes 102 of an upper flange 104 of the first rung plate, and lower flange holes 106 of lower flange 108 of the first rung plate 92, to secure the first rung plate 90 to the first rail 12. The lower flange 108 is connected to and below the center portion 96 and the upper flange 104 is connected to and above the center portion 96. The left rung plate 92, now attached to the first wide rung 18, is similarly attached to the second rail 14 as the right rung plate 90 is attached to the first rail 12. In this way, the right and let rung plates act as intermediary components to attach the first wide rung 18 to the first and second rails. Whether covers or rung plates are used to attach the wide rungs to the rails, the wide rungs support at least 250 lbs., and preferably at least 400 lbs. without failure.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a first rail;

a second rail;

a standard rung having a length that extends between the first rail and the second rail and a maximum width that extends perpendicular to the length; and a first wide rung, the first wide rung having a first end portion coupled to the first rail and a second end portion coupled to the second rail, the first wide rung including:

a top portion having a first edge and a second edge that extend between the first end portion and the second end portion along a length of the first wide rung, the first edge and the second edge defining a width therebetween, the width of the first wide rung wider than the maximum width of the standard rung, a first linear wall extending down from the first edge, a second linear wall extending down from the second edge, a third linear wall extending from the first linear wall at an acute angle relative to the top portion, and a fourth linear wall extending from the second linear wall at an acute angle relative to the top portion and connected to the third linear wall, the top portion, the first linear wall, the second linear wall, the third linear wall, and the fourth linear wall defining a cavity, at least one arcuate slot protruding from an interior surface of first wide rung and extending through the cavity along the length of the first wide rung; wherein the at least one arcuate slot includes a first arcuate slot disposed adjacent the first edge, a second arcuate slot disposed adjacent the second edge and extending through the cavity along the length of the first wide rung, and a third arcuate slot disposed adjacent a joint between the third linear wall and the fourth linear wall and extending through the cavity along the length of the first wide rung.

2. The ladder of claim 1, wherein the first wide rung is made of aluminum.

3. The ladder of claim 1, wherein the first arcuate slot is disposed at a joint between the top portion and the first linear wall.

4. The ladder of claim 1, wherein the second arcuate slot is disposed on the top portion of the first wide rung and is spaced from a joint between the top portion and the second linear wall.

5. The ladder of claim 1, wherein the third arcuate slot is disposed at a joint between the third linear wall and the fourth linear wall.

6. The ladder of claim 1, further including a second wide rung having a first end portion coupled to the first rail and a second end portion coupled to the second rail, the second wide rung including a top portion having a first edge and a second edge that extend between the first end portion and the second end portion, the first edge and the second edge of the second wide rung defining a third width therebetween, the first wide rung and the second wide rung are attached to the first rail and the second rail along one portion of the ladder and the standard rung is attached to another portion of the ladder that does not include the second wide rung.

7. The ladder of claim 1, wherein the first linear wall extends a first distance between the top portion and the third linear wall, the second linear wall extends a second distance between the top portion to the fourth linear wall, and the second distance is greater than the first distance.

8. The ladder of claim 1, wherein at least one of the arcuate slots have a generally C-shaped cross section.

9. The ladder of claim 1, wherein the first wide rung is a one-piece extrusion.

10. A ladder comprising:

a first rail;

a second rail;

a first rung having a length that extends between the first rail and the second rail and a maximum width that extends perpendicular to the length;

a second rung having a first end portion coupled to the first rail and a second end portion coupled to the second rail, the second rung including a top portion that is generally planar with a bottom portion depending therefrom to form a hollow pentagon-shaped cross section of the second rung formed from at least five linear walls, the top portion having a first edge and a second edge that extend between the first end portion and the second end portion along a length of the second rung, the first edge and the second edge defining a width of the second rung therebetween, the width of the second rung being greater than the maximum width of the first rung, the top portion and the bottom portion defining a cavity therebetween, the second rung including at least one arcuate slot that protrudes into the cavity from an inner surface second rung and extends along the length of the second rung; and a first rung plate disposed between the first end portion and the first rail, the first rung plate having a center flange portion disposed in a first plane and a first outer flange portion and second outer flange portion disposed in a second plane parallel to and spaced from the first plane, the center flange portion include at least one hole aligned with the at least one arcuate slot, the first outer flange portion and the second outer flange portion being coupled to the first rail; wherein the first outer flange portion includes at least one hole that receives a fastener to couple the first outer flange portion to the first rail, and wherein the second outer flange portion includes at least one hole that receives a fastener to couple the second outer flange portion to the first rail.

11. The ladder of claim 10, wherein the center flange portion is larger than the hollow pentagon-shaped cross section of the second rung.

* * * * *